US009410443B2

(12) United States Patent
Dube et al.

(10) Patent No.: US 9,410,443 B2
(45) Date of Patent: Aug. 9, 2016

(54) VARIABLE VANE DAMPING ASSEMBLY

(75) Inventors: David P. Dube, Saco, ME (US);
Richard K. Hayford, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 1128 days.

(21) Appl. No.: 13/360,002

(22) Filed: Jan. 27, 2012

(65) Prior Publication Data
US 2013/0195651 A1 Aug. 1, 2013

(51) Int. Cl.
| F01D 17/16 | (2006.01) |
| F01D 25/16 | (2006.01) |
| F01D 25/06 | (2006.01) |
| F04D 29/56 | (2006.01) |
| F01D 25/04 | (2006.01) |
| F16C 27/06 | (2006.01) |

(52) U.S. Cl.
CPC ............ F01D 17/162 (2013.01); F01D 25/164 (2013.01); F04D 29/563 (2013.01); *F01D 25/04* (2013.01); *F05D 2260/96* (2013.01); *F05D 2300/43* (2013.01); *F05D 2300/501* (2013.01); *F16C 27/063* (2013.01)

(58) Field of Classification Search
CPC .............. F01D 5/00; F01D 5/02; F01D 5/10; F01D 5/26; F01D 25/04; F01D 25/06; F01D 25/164; F04D 29/563; F05D 2300/43; F05D 2300/431; F05D 2300/437; F05D 2300/501
USPC .................... 415/148, 151, 159, 160
See application file for complete search history.

(56) References Cited

U.S. PATENT DOCUMENTS

| 2,778,564 | A | * | 1/1957 | Halford ................. F01D 17/162 138/46 |
| 2,932,440 | A | * | 4/1960 | Hemsworth ................... 415/156 |
| 3,030,132 | A | * | 4/1962 | Compton ....................... 403/203 |
| 3,754,317 | A | * | 8/1973 | Taylor ............................ 29/451 |
| 4,050,844 | A | * | 9/1977 | Miller et al. ................... 415/147 |
| 4,808,069 | A | | 2/1989 | Bonner et al. |
| 5,308,226 | A | | 5/1994 | Venkatasubbu et al. |
| 6,129,512 | A | | 10/2000 | Agram et al. |
| 6,682,299 | B2 | | 1/2004 | Bowen et al. |
| 6,767,183 | B2 | | 7/2004 | Schilling et al. |
| 6,887,035 | B2 | | 5/2005 | Bruce |
| 7,094,022 | B2 | | 8/2006 | Bruce |
| 7,121,727 | B2 | | 10/2006 | Bruce et al. |
| 7,220,098 | B2 | * | 5/2007 | Bruce .................... F01D 17/162 415/160 |
| 7,360,990 | B2 | * | 4/2008 | Barbe et al. .................... 415/160 |
| 2005/0232757 | A1 | * | 10/2005 | Bruce .................... F01D 17/162 415/160 |

(Continued)

FOREIGN PATENT DOCUMENTS

| DE | 1136350 | 9/1962 |
| EP | 1870600 | 12/2007 |
| EP | 1961922 | 8/2008 |

OTHER PUBLICATIONS

Extended European Search Report for Application No. 13151441.6 dated Mar. 22, 2016.

*Primary Examiner* — Nathaniel Wiehe
*Assistant Examiner* — Brian O Peters
(74) *Attorney, Agent, or Firm* — Carlson, Gaskey & Olds, P.C.

(57) ABSTRACT

A variable vane damping assembly includes an inner bushing and an outer bushing. The inner bushing comprises an elastomeric material.

18 Claims, 3 Drawing Sheets

(56) References Cited

U.S. PATENT DOCUMENTS

| | | | |
|---|---|---|---|
| 2006/0251887 A1* | 11/2006 | Welsch | 428/339 |
| 2007/0099027 A1 | 5/2007 | Krishnamurhty et al. | |
| 2008/0031730 A1* | 2/2008 | Houradou et al. | 415/173.2 |
| 2008/0206045 A1* | 8/2008 | Foucher | F01D 17/162 415/160 |
| 2009/0074569 A1* | 3/2009 | Garcin et al. | 415/148 |
| 2011/0262064 A1* | 10/2011 | Burgeff et al. | 384/220 |

* cited by examiner

VARIABLE VANE DAMPING ASSEMBLY

BACKGROUND

This disclosure relates generally to a variable vane and, more particularly, to damping vibrations of the variable vane during operation.

Turbomachines, such as gas turbine engines, typically include a fan section, a compressor section, a combustor section, and a turbine section. Air moves into the turbomachine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

Some turbomachines include variable vanes. Changing the positions of the variable vanes influences how flow moves through the turbomachine. Variable vanes are often used within the first few stages of the compressor section. The variable vanes are exposed to vibrations during operation of the turbomachine. The vibrations can fatigue and damage the variable vanes.

SUMMARY

A variable vane damping assembly according to an exemplary aspect of the present disclosure includes, among other things, an inner bushing that is bondable to a variable vane and an outer bushing that is bondable to the inner bushing. The inner bushing comprises an elastomeric material.

In a further non-limiting embodiment of the foregoing variable vane damping assembly, the inner bushing may be bondable to a trunnion of the variable vane.

In a further non-limiting embodiment of any of the foregoing variable vane damping assemblies, the outer bushing may comprise a metallic material.

In a further non-limiting embodiment of the foregoing variable vane damping assembly, the inner bushing may be molded, and the outer bushing and the variable vane may hold the inner bushing during the molding.

In a further non-limiting embodiment of the foregoing variable vane damping assembly, the inner bushing may be bonded to the outer bushing and the variable vane during the molding.

In a further non-limiting embodiment of the foregoing variable vane damping assembly, the inner bushing and the outer bushing may be configured to rotate together with the variable vane.

In a further non-limiting embodiment of the foregoing variable vane damping assembly, the inner bushing and the outer bushing may have a cylindrical cross-section.

A variable vane assembly according to another exemplary aspect of the present disclosure includes, among other things, a trunnion and an elastomeric bushing bonding to the trunnion. An outer bushing is bonded to the elastomeric bushing.

In a further non-limiting embodiment of the foregoing variable vane damping assembly, the trunnion may be at a radially inner end of the variable vane relative to a central axis of a turbomachine having the variable vane.

In a further non-limiting embodiment of any of the foregoing variable vane damping assemblies, the trunnion may be formed with the variable vane.

In a further non-limiting embodiment of any of the foregoing variable vane damping assemblies, the variable vane is positioned within a compression section of a geared turbine engine.

In a further non-limiting embodiment of any of the foregoing variable vane damping assemblies, the trunnion, the elastomeric bushing, and the outer bushing may rotate together with the variable vane.

In a further non-limiting embodiment of any of the foregoing variable vane damping assemblies, the trunnion, the elastomeric bushing, and the outer bushing are received within a recess of a compressor shroud.

In a further non-limiting embodiment of any of the foregoing variable vane damping assemblies, the outer bushing is metallic.

A method of damping a variable vane according to another exemplary aspect of the present disclosure includes, among other things, moving an elastomeric material together with a variable vane. The method positions the elastomeric material within an outer bushing.

In a further non-limiting embodiment of the foregoing method of damping a variable vane, the method may include bonding the elastomeric material to the variable vane.

In a further non-limiting embodiment of any of the foregoing methods of damping a variable vane, the method may include bonding the elastomeric material to the outer bushing.

In a further non-limiting embodiment of any of the foregoing methods of damping a variable vane, the method may include molding the elastomeric material and holding the elastomeric material during the molding using the variable vane and the outer bushing.

In a further non-limiting embodiment of any of the foregoing methods of damping a variable vane, the meth may include moving the outer bushing together with the variable vane.

In a further non-limiting embodiment of any of the foregoing methods of damping a variable vane, the moving may comprises rotating the variable vane about a radial axis to influence flow through a turbomachine.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
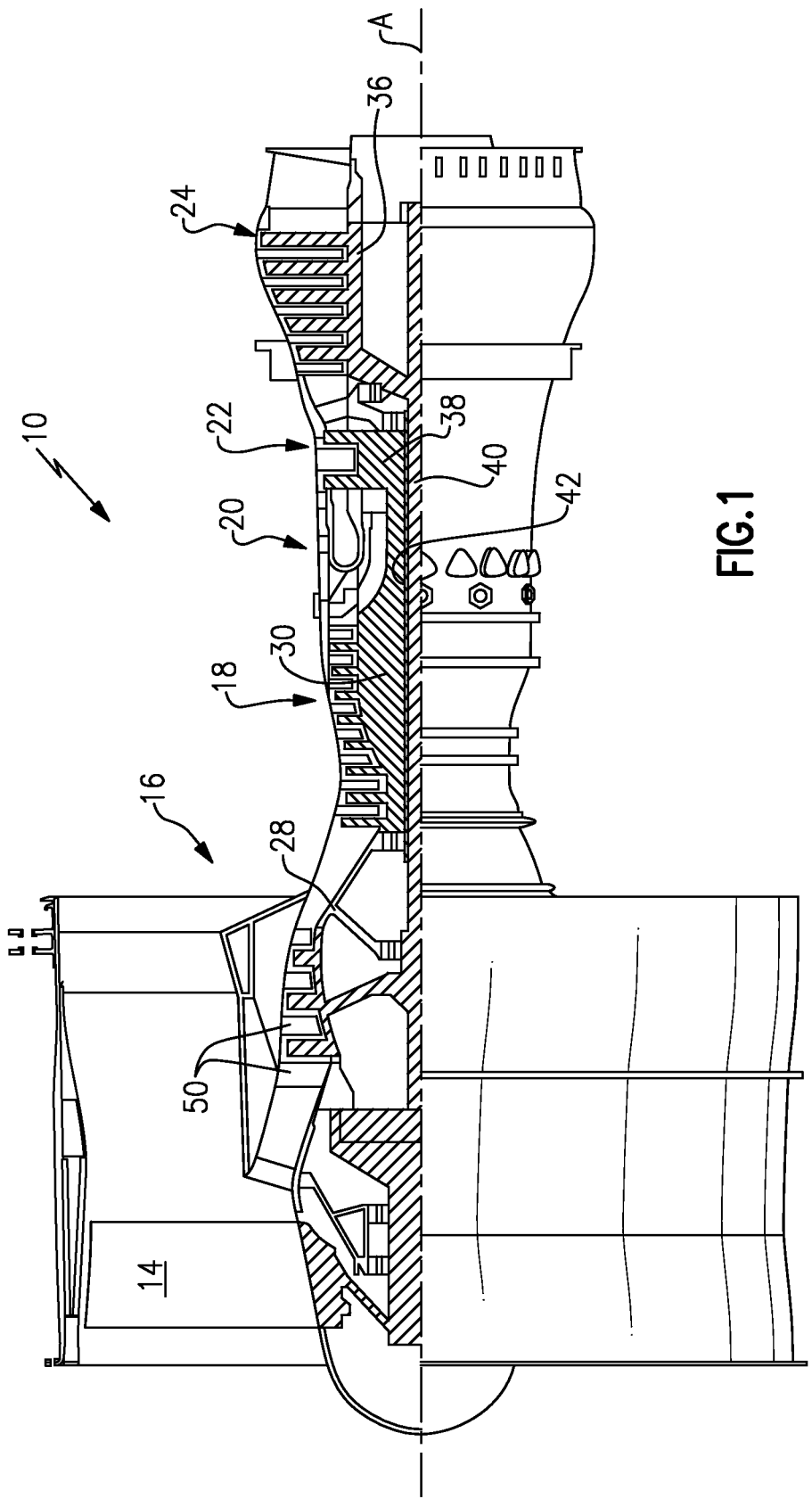
FIG. 1 shows a highly schematic view of an example gas turbine engine.
Figure 2:
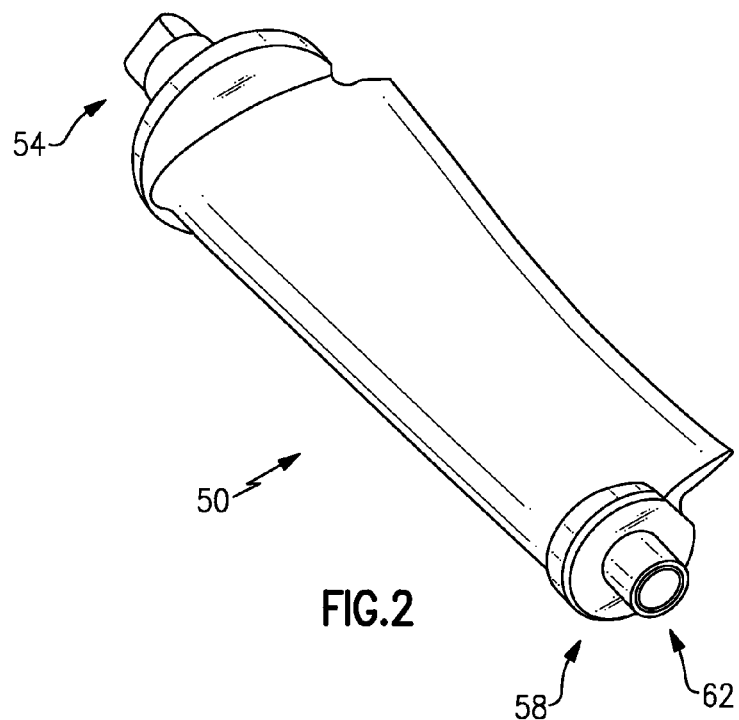
FIG. 2 shows a perspective view of an example variable vane assembly.
Figure 5:
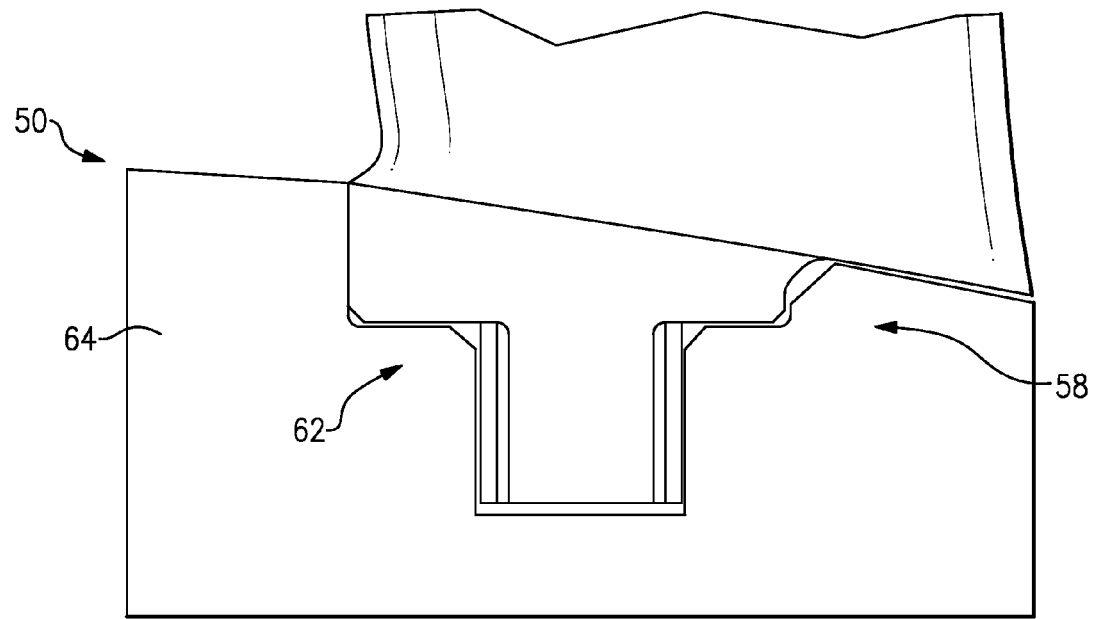
FIG. 5 shows a section view at line 5-5 in FIG. 3.
Figure 4:
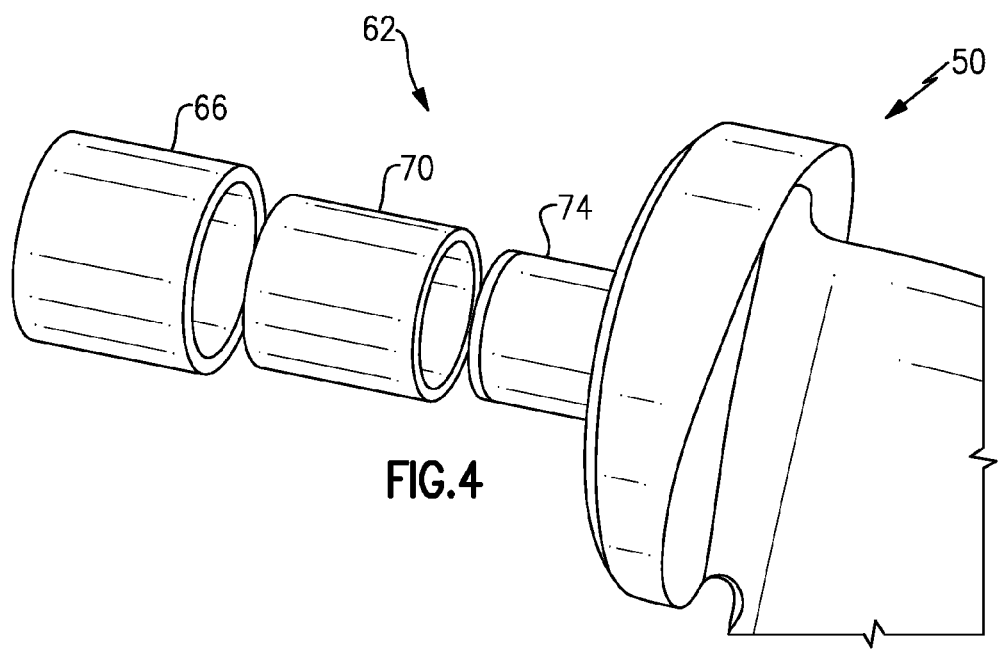
FIG. 4 shows an exploded view of the FIG. 3 radially inner end.
Figure 3:
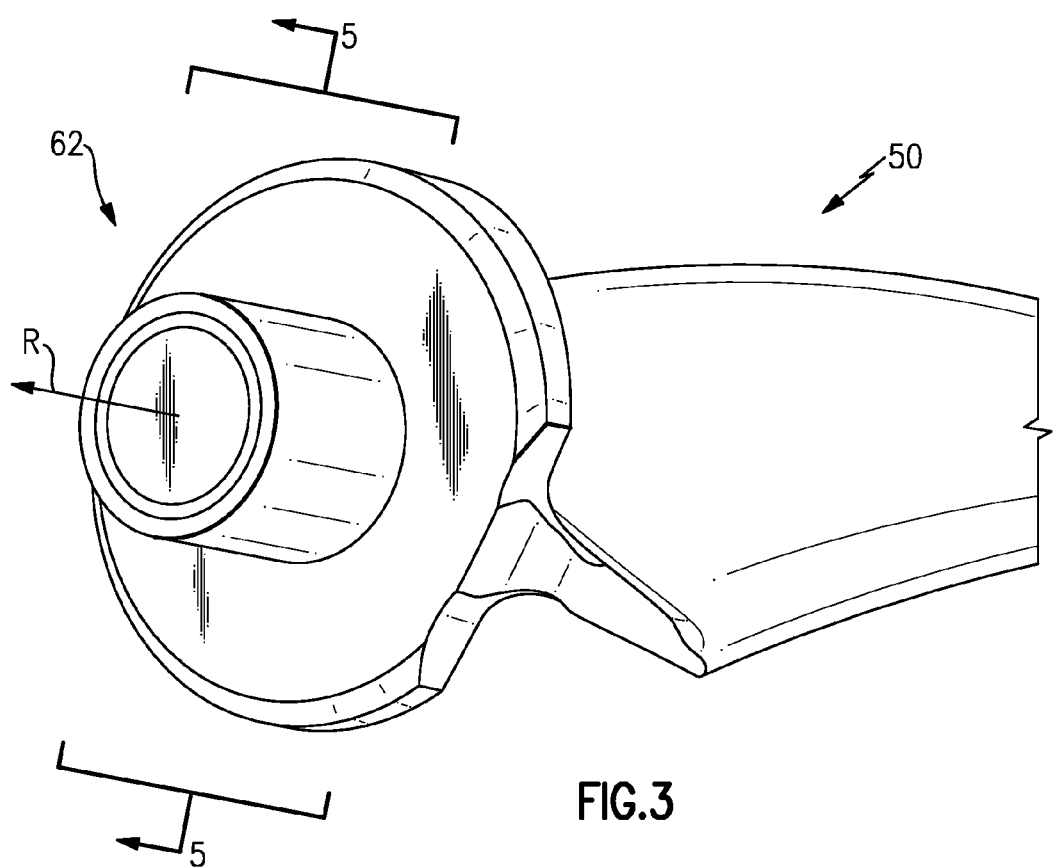
FIG. 3 shows a close-up view of a radially inner end of the FIG. 2 assembly.

Referring to FIG. 1, an example turbomachine, such as a gas turbine engine 10, is circumferentially disposed about an axis A. The gas turbine engine 10 includes a fan 14, a low-pressure compressor section 16, a high-pressure compressor section 18, a combustion section 20, a high-pressure turbine section 22, and a low-pressure turbine section 24. Other example turbomachines may include more or fewer sections.

The engine 10 in the disclosed embodiment is a high-bypass geared architecture aircraft engine. In one disclosed embodiment, the bypass ratio of the engine 10 is greater than 10:1, the diameter of the fan 14 is significantly larger than that of the low-pressure compressor 16, and the low-pressure turbine section 24 has a pressure ratio that is greater than 5:1.

It should be understood, however, that the above parameters are only exemplary of one embodiment of a geared architecture engine and that the present application is applicable to other gas turbine engines including direct drive turbofans.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The low-pressure compressor section 16 and the high-pressure compressor section 18 include rotors 28 and 30, respectively. The high-pressure turbine section 22 and the low-pressure turbine section 24 include rotors 36 and 38, respectively. The rotors 36 and 38 rotate in response to the expansion to rotatably drive rotors 28 and 30. The rotor 36 is coupled to the rotor 28 with a spool 40, and the rotor 38 is coupled to the rotor 30 with a spool 42.

The examples described in this disclosure are not limited to the two-spool gas turbine architecture described, however, and may be used in other architectures, such as the single-spool axial design, a three-spool axial design, and still other architectures. That is, there are various types of gas turbine engines, and other turbomachines, that can benefit from the examples disclosed herein.

Referring to FIGS. 2-5 with continued reference to FIG. 1, in this example, the first few stages of low-pressure compressor section 16 include variable vane assemblies 50. The variable vane assemblies 50 extend from a radially outer end 54 to a radially inner end 58 relative to the axis A. The example variable vane assemblies 50 do not rotate about the axis A.

In this example, the radially inner end 58 of the variable vane assembly 50 includes a variable vane damping assembly 62. The radially inner end 58 is received within socket formed in an inner shroud 64 of the low-pressure compressor 16. The variable vane damping assembly 62 facilitates vibration absorption, which help protect the variable vane assembly 50 from damage during operation of the gas turbine engine 10.

In this example, the variable vane damping assembly 62 includes an outer bushing 66 and an inner bushing 70 secured to a trunnion 74. The outer bushing 66, the inner bushing 70, and the trunnion 74 each have cylindrical cross-sections in this example. The outer bushing 66, the inner bushing 70, and the trunnion 74 are coaxially arranged about the axis R, which is the axis of rotation of the variable vane assembly 50. As can be appreciated, the axis R extends radially from the axis A.

In this example, the inner bushing 70 is an elastomeric material, such as a silicone rubber compound. The example inner bushing 70 is bonded to both the trunnion 74 and the outer bushing 66 as the inner bushing 70.

In one example, a method of assembling the vibration damping assembly 62 includes positioning the outer bushing 66 over the trunnion 74 so that the outer bushing 66 is coaxial with the axis R. Space between the outer bushing 66 and the trunnion 74 is then filled with a liquid elastomeric material. The outer bushing 66 and the trunnion 74 thus provide at least some portion of a mold cavity for the inner bushing 70. The outer bushing 66 and the trunnion 74 hold liquid elastomeric material until the material cures to form the inner bushing 70.

The liquid elastomeric material bonds to outer bushing 66 and the trunnion 74 as the liquid elastomeric material cures to form the inner bushing 70. A bonding agent may be used to improve the bond between the elastomeric material of the inner bushing 70, the outer bushing 66, and the trunnion 74.

Because the inner bushing 70 is bonded to both the outer bushing 66 and the trunnion 74, the variable vane damping assembly 62 rotates together about the axis R with the remaining portions of the variable vane assembly 50. The variable vane damping assembly 62, by contrast, rotates relative to the inner shroud 64. The variable vane assembly 50 is rotated to influence the flow of air moving through the engine 10.

Although the example variable vane damping assembly 62 is described as located at the radially inner end 58 of the variable vane assembly 50, other examples may include a variable vane damping assembly at the radially outer end of the variable vane assembly 50 instead of, or in addition to, the variable vane damping assembly 62.

Features of the disclosed example include a variable vane damping assembly that reduces the magnitude of vibratory responses in variable vanes. Geared turbomachines are particularly appropriate for incorporating the disclosed examples due to the relatively low temperatures experienced by variable vanes in the geared turbomachine. Due at least in part to the reduction in vibratory loads experienced by the variable vane, different design options are available to designers of variable vanes.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A variable vane damping assembly, comprising: an inner bushing that is bondable to a variable vane; and an outer bushing that is bondable to the inner bushing, wherein the inner bushing comprises an elastomeric material, wherein the inner bushing and the outer bushing are configured to rotate together with the variable vane, wherein the inner bushing and the outer bushing are both cylindrical, wherein the inner bushing and the outer bushing have a cylindrical cross-section, and the inner bushing and the outer bushing have a uniform diameter along an entire axial length of the inner bushing and the outer bushing and wherein the inner bushing is bonded to a trunnion of the variable vane.

2. The variable vane damping assembly of claim 1, wherein the outer bushing comprises a metallic material.

3. The variable vane damping assembly of claim 1, wherein an entirety of the inner bushing is molded, and the outer bushing and the variable vane hold the inner bushing during the molding.

4. The variable vane damping assembly of claim 1, wherein the inner bushing comprises, exclusively, the elastomeric material.

5. The variable vane damping assembly of claim 1, wherein the inner bushing is secured to the variable vane exclusively with the elastomeric material.

6. The variable vane damping assembly of claim 1, wherein the inner bushing has a radially innermost facing surface, and the inner bushing is bondable to a variable vane along an entire axial length of the radially innermost facing surface.

7. A variable vane assembly, comprising: a trunnion of a variable vane; an elastomeric bushing bonded and secured to the trunnion with exclusively an elastomeric material; and an outer bushing bonded to the elastomeric bushing, the outer bushing being a cylindrical outer bushing, the outer bushing having a cylindrical cross-section, and the outer bushing having a uniform diameter along an entire axial length of an outer surface of the outer bushing.

8. The variable vane assembly of claim 7, wherein the trunnion is at a radially inner end of the variable vane relative to a central axis of a turbomachine having the variable vane.

9. The variable vane assembly of claim 7, wherein the trunnion is formed with the variable vane.

10. The variable vane assembly of claim 7, wherein the outer bushing is metallic.

11. The variable vane assembly of claim 7, wherein the elastomeric bushing is entirely comprised of the elastomeric material.

12. The variable vane assembly of claim 7, wherein the elastomeric bushing has a radially innermost facing surface, and the elastomeric bushing is bonded to the variable vane along an entire axial length of the radially innermost facing surface.

13. The variable vane assembly of claim 7, wherein the elastomeric bushing has a radially innermost facing surface extending from a first axial end of the elastomeric bushing to an opposite, second axial end of the elastomeric bushing, the elastomeric material providing the entire radially innermost facing surface.

14. A method of damping a variable vane, comprising: moving an elastomeric material together with a variable vane; positioning the elastomeric material within an outer bushing; and bonding the elastomeric material to the variable vane; and securing the outer bushing to the variable vane using, exclusively, the elastomeric material, wherein the outer bushing is a cylindrical outer bushing, the outer bushing having a cylindrical cross-section, and the outer bushing having a uniform diameter along an entire axial length of an outer surface of the outer bushing.

15. The method of claim 14, including bonding the elastomeric material to the outer bushing.

16. The method of claim 14, including molding the elastomeric material and holding the elastomeric material during the molding using the variable vane and the outer bushing.

17. The method of claim 14, wherein the outer bushing has a first axial length, and the elastomeric material has a second axial length that is the same as the first axial length.

18. The method of claim 14, wherein the variable vane has a trunnion with a radially outwardly facing surface that is contacted exclusively with the elastomeric material.

* * * * *